Dec. 15, 1925.

S. S. LEVY 1,565,575

MACHINE FOR MOLDING CONCRETE BLOCKS

Filed Dec. 24, 1923 4 Sheets-Sheet 1

Inventor.
Samuel S. Levy
by Heard Smith & Tennant
Attys

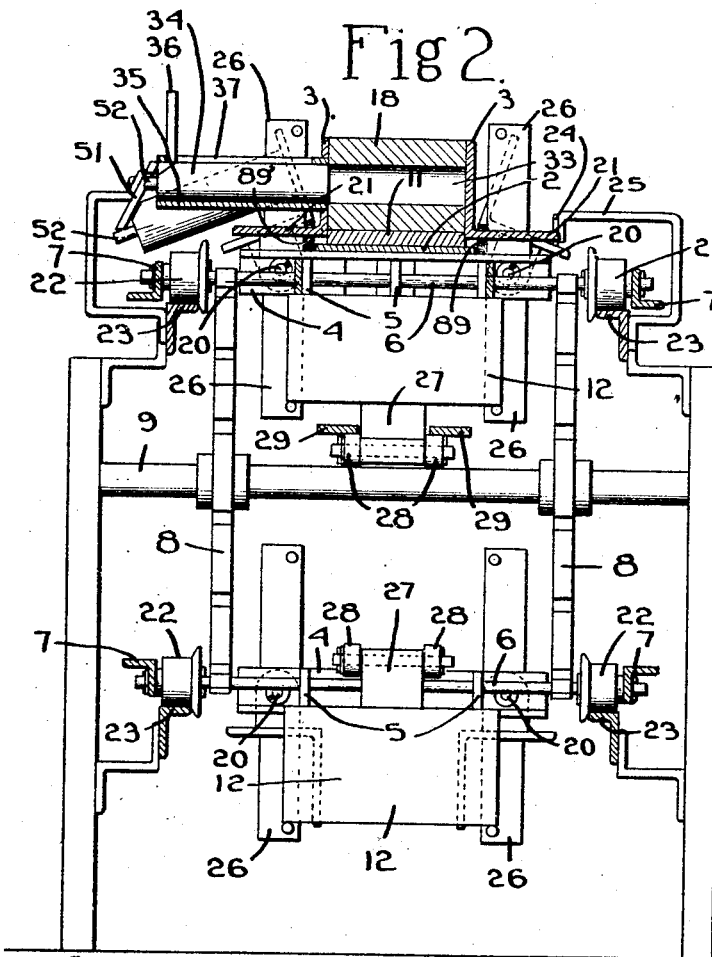
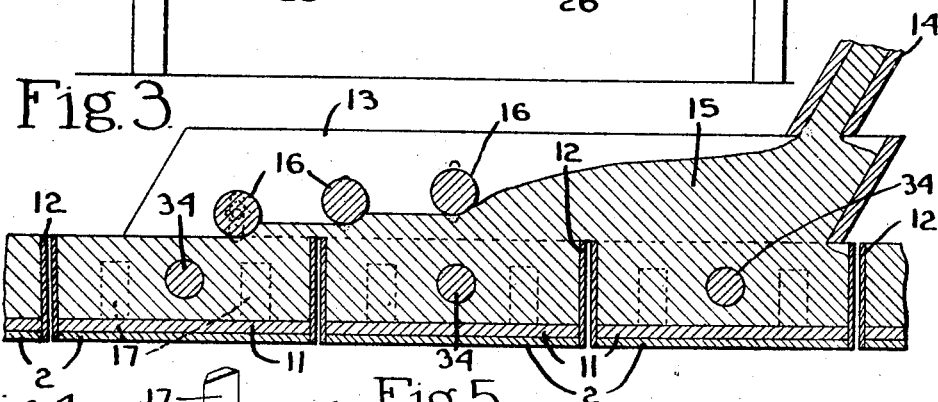
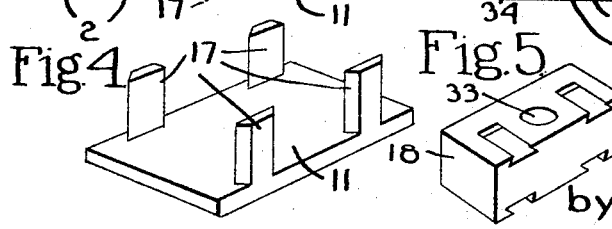

Dec. 15, 1925.
S. S. LEVY
1,565,575
MACHINE FOR MOLDING CONCRETE BLOCKS
Filed Dec. 24, 1923          4 Sheets-Sheet 3
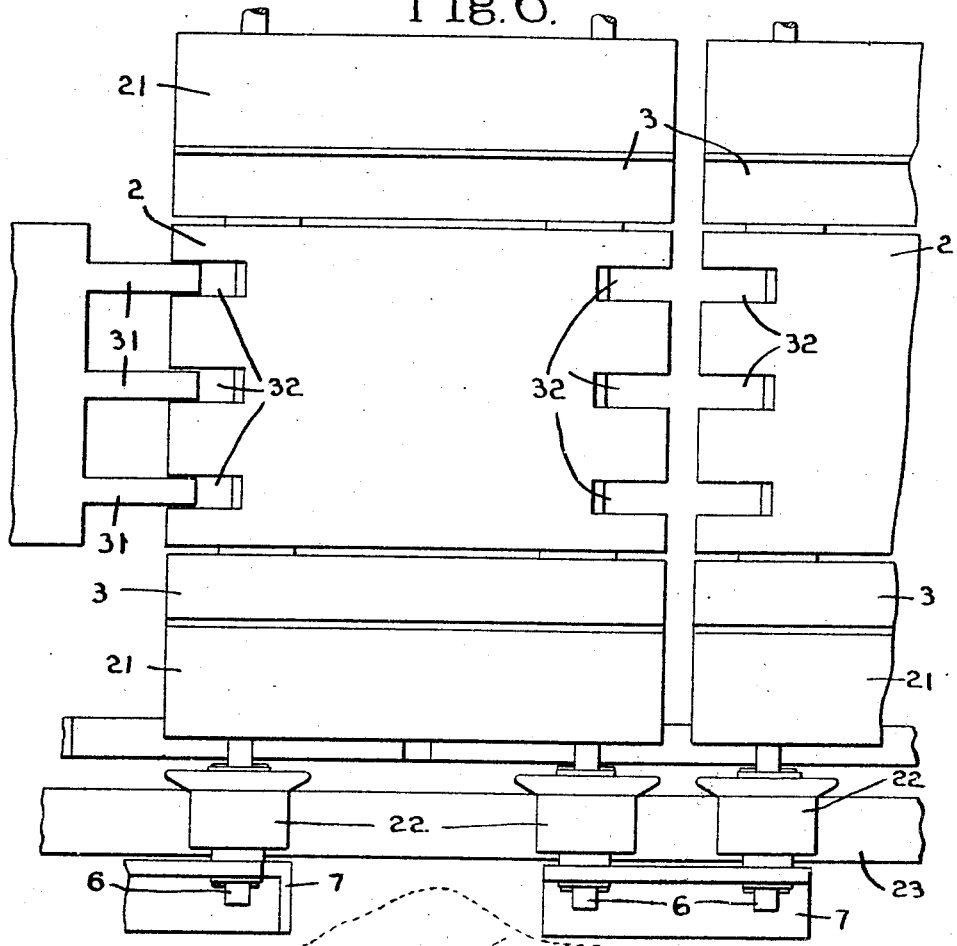
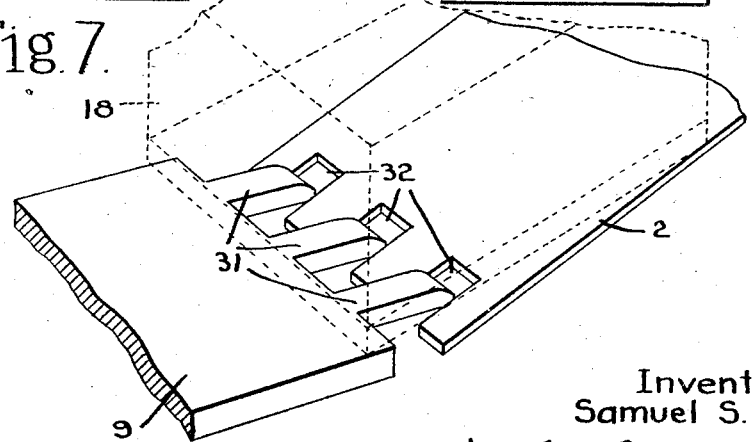
Inventor.
Samuel S. Levy
by Heard Smith & Tennant.
Attys.

Dec. 15, 1925.                                                 1,565,575
S. S. LEVY
MACHINE FOR MOLDING CONCRETE BLOCKS
Filed Dec. 24, 1923          4 Sheets-Sheet 4

Inventor.
Samuel S. Levy
by Heard Smith & Tennant.
Attys.

Patented Dec. 15, 1925.

1,565,575

UNITED STATES PATENT OFFICE.

SAMUEL S. LEVY, OF BOSTON, MASSACHUSETTS.

MACHINE FOR MOLDING CONCRETE BLOCKS.

Application filed December 24, 1923. Serial No. 682,523.

*To all whom it may concern:*

Be it known that I, SAMUEL S. LEVY, a citizen of the United States, and resident of Boston, county of Suffolk, State of Massachusetts, have invented an Improvement in Machines for Molding Concrete Blocks, of which the following description, in connection with the accompanying drawing, is a specification, like characters on the drawing representing like parts.

This invention relates to a machine for molding concrete blocks and especially to a machine of that type in which the molds are connected together in endless chain formation.

The features wherein the invention reside will be hereinafter described and will be more particularly pointed out in the claims.

In the drawings wherein I have illustrated a selected embodiment of my invention, Fig. 1 is a side view partially broken out of a machine made in accordance with my invention.

Fig. 2 is an enlarged sectional view on the broken line 2—2, Fig. 1;

Fig. 3 is a longitudinal sectional view showing the manner in which the molds are filled;

Fig. 4 is a perspective view of the pallet which is located in each mold and on which the block is supported as it is removed from the mold;

Fig. 5 is a perspective view of the concrete block which is made in my mold;

Fig. 6 is an enlarged plan view of one of the molds showing the manner in which the block is removed therefrom at the end of the run;

Fig. 7 is a perspective view illustrating the manner in which the blocks are delivered from the molds after they are formed;

Figure 1:
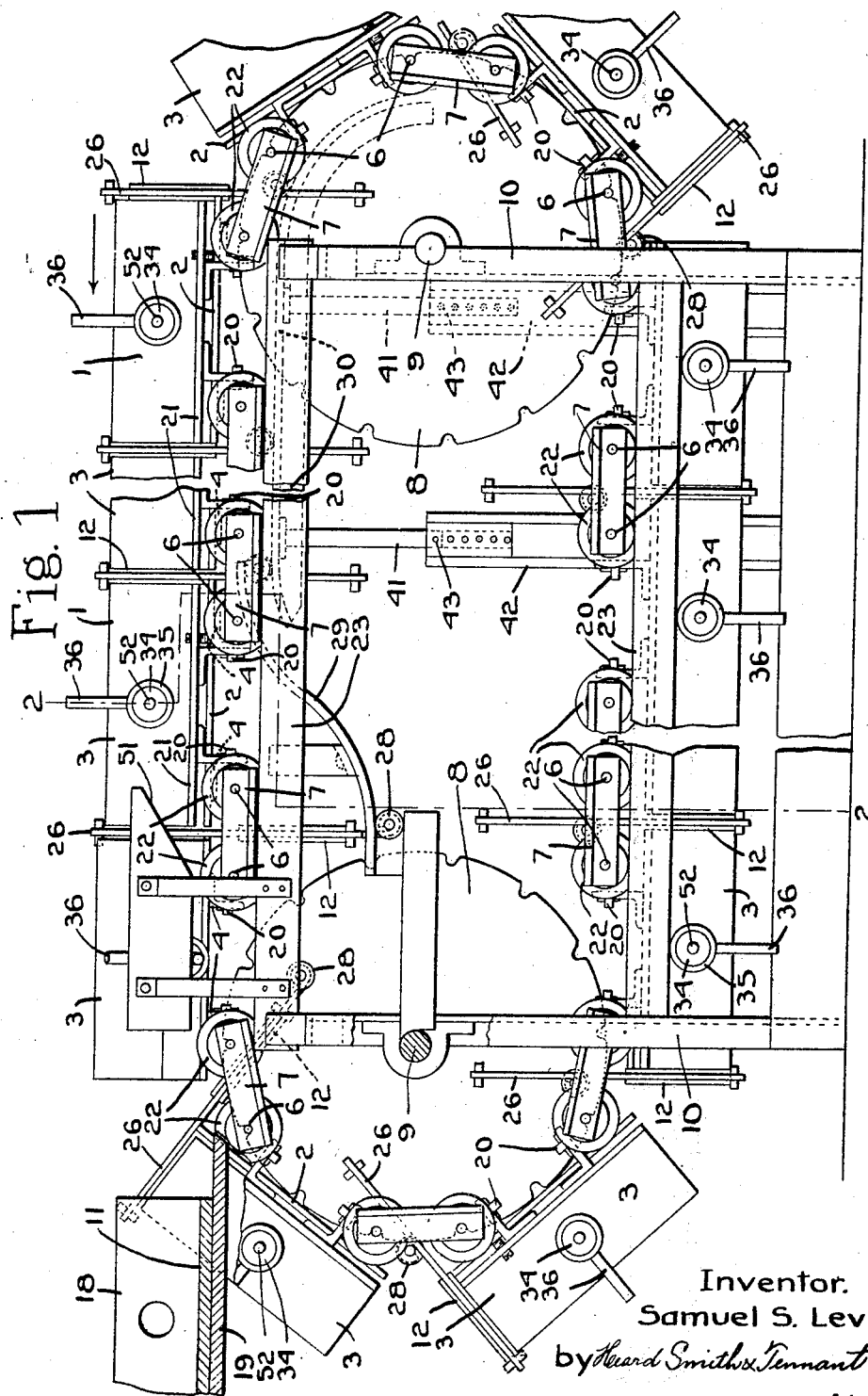

My improved machine comprises a plurality of molds indicated generally at 1 which are connected together in endless chain formation. Each mold is formed with a bottom 2 and two sides 3, the molds being open at the top. The bottoms of the molds are connected together to form an endless chain arrangement and for this purpose each mold bottom has secured thereto at its end an angle iron cross piece 4 carrying bearings 5 in which is journalled a transversely-extending shaft 6. Each mold, therefore, has two of these shafts 6, one at each end thereof.

The shafts of adjacent molds are connected together at their ends by tie pieces or links 7 thus making the endless chain arrangement, which comprises the mold bottoms 3 and links 7 arranged alternately. This endless chain arrangement passes around and is driven by sprocket wheels 8 mounted on shafts 9 journalled in a suitable frame 10. Either or both of the shafts 9 may be positively driven. The molds thus constituted are filled with concrete as they are moving along the upper run and the molded blocks are delivered from the molds at one end of the upper run.

The molds are moved in the direction of the arrow Fig. 1 and the molded blocks are delivered from the molds at the left hand end. A pallet or board 11 is placed in each mold on which the block is formed and the molds are separated from each other by partitions 12.

The molds may be filled as they are moving along the upper run of the endless chain arrangement by any suitable means. I have herein shown for this purpose an open bottomed hopper device 13 which is situated above the upper run of the endless chain arrangement and into which concrete material may be delivered through a spout or chute 14. This hopper 13 is of the same width as the molds and as the molds travel underneath it the concrete material 15 is delivered into the molds.

The hopper is provided with a plurality of pressing rolls 16 arranged at different distances from the top of the mold. These rolls act to compress the concrete material 15 and cause it to completely fill each mold. The last roll 16 serves also as a levelling roll and it determines the thickness of the block.

The machine herein shown is constructed so that it is possible to make blocks of varying thickness and of varying strength from the same material. This is accomplished by mounting the rolls 16 so that they can be vertically adjustable. The positioning of the last roll 16 determines the thickness of the block and by adjusting the other rolls it is possible to compress the material more or less as it is filled into the mold and before the block passes under the levelling roll. If the aggregate is firmly compressed a much stronger block will be provided than if the aggregate is only lightly compressed and since the degree to which the aggregate is compressed depends on the relative position of the rolls 16 it is possible by adjusting these rolls to form a block of any desired strength.

The pallet 11 is herein shown as having arms 17 extending therefrom, the purpose of which is to form a block such as is illustrated in my Patent No. 1,424,172, dated August 1st, 1922, and which has dove-tail grooves formed in opposite faces thereof. A block of this type is illustrated in Fig. 5 of the drawings at 18 and this block is shown as having the grooves 19 in opposite faces, such grooves being formed by the arms 17 as the block is molded.

In order to facilitate the removal from each mold of the corresponding pallet 11 and the concrete block 18 formed thereon I propose to pivotally mount the sides 3 of each mold so that they can be swung away from each other after the block is formed and at the time the molded block is to be delivered from the mold and I have also mounted the partitions 12 between the molds so that they may be withdrawn from between the blocks. With this arrangement the sides of the molds and the partitions are separated from the molded blocks as the blocks approach the left-hand end of the upper run of the endless chain arrangement in Fig. 1 and as the molds pass around the sprocket wheels 8 the pallets 11 with the blocks 18 thereon are automatically delivered onto a receiving platform 19 from which they may be removed.

In order to properly support the molds while they are being filled with concrete I provide the shafts 6 with rollers 22 and form the frame 9 with tracks 23 on which the rollers run. I will preferably employ a track 23 for supporting the molds as they travel over both the upper and the lower runs of the endless chain device.

The sides 3 of the molds are pivotally mounted at 20 so that they can swing outwardly and each side is formed with the laterally-extending flange 21.

During the time that the molds are being filled the sides 3 are in the full line position Fig. 2, parallel to each other. As the filled molds approach the left-hand end of the upper run in Fig. 1 these sides 3 are swung away from each other into the dotted line position Fig. 2 thus opening the mold to facilitate the delivery of the molded block 18 therefrom. This opening movement of each mold side 3 may be secured by a cam face 24 formed on a bracket 25 that is secured on the frame. As the filled molds approach the left-hand end of the upper run the flange 21 of the side engages the cam face 24 and the latter swings the side 3 away from the block. This is the construction illustrated at the right hand of Fig. 2 and is the construction which will preferably be employed for swinging both sides 3 of the mold away from the block in case the mold is not provided with a core as is presently described. When the mold is thus provided with a core the side carrying the core may be swung away from the block by a cam surface 51 as will be presently described.

The cam faces are of sufficient length so that they hold the sides 3 of the mold open until after the block and its pallet has been delivered. As the molds pass around into the under run of the endless chain device the sides return to their closed position by gravity and remain in this position as they pass around the right-hand sprocket wheels 8 in Fig. 1 and into the upper run of the endless chain arrangement.

I have provided adjustable stop screws 89 which determine the position of the sides 3 when they are in their operative position. These stop screws 89 provide means whereby the sides 3 will be held parallel to each other while the mold is in condition to receive the aggregate. This ensures that a block with parallel sides will always be formed.

I have stated above that the partitions 12 are also arranged to be withdrawn from the molds before the molded blocks are delivered. Each of the molds has secured thereto at one end thereof a guide 26 on which a partition 12 is slidably mounted and each partition has secured to it an extension 27 carrying rolls 28 that are adapted to engage a cam track 29 adjacent the delivery end of the conveyer. This cam track operates to draw the partitions downwardly below the level of the mold bottoms so that as the molds pass around the left-hand sprocket 8 the partitions are entirely withdrawn. At this time, therefore, not only are the sides 3 of the molds opened out but the partitions are withdrawn so that the pallets 11 with the molded blocks 18 thereon are free to be delivered onto the receiving apron 19.

As the molds pass into the lower run of the endless chain arrangement the partitions will gravitate downwardly and thus assume their operative position and when the molds pass around the right-hand sprocket 8 into the upper run of the chain the rolls 28 of the partitions run onto a track 30 which holds them in their operative position until they engage the cam track 29 adjacent the delivery end of the conveyer.

I will preferably make the track 30 vertically adjustable so as to provide for making blocks of different thickness. This track is provided with depending arms 41 that are adjustably secured to posts 42 secured to the frame. The arms are vertically adjustable on the posts and are held in their adjusted position by means of pins or bolts 43 which are inserted through the post and the arm. The post is provided with a plurality of openings in any one of which the pin or bolt 43 may be inserted thus providing for adjusting the track 30 vertically. The track 30 will always be adjusted so that when the rolls 28 are passing thereover the top edge of the partitions 12 will be in line with the top of the block to be manufactured. With this arrangement it is possible to make a block having a thickness equal to the full depth of the mold or to make a block of less thickness by simply adjusting the track 30 into the desired position.

In order to provide means for automatically delivering the pallets 11 and their molded blocks onto the receiving platform 19 I propose to make the receiving end of said platform with fingers 31 and to form the ends of the mold bottoms 2 with notches 32 through which the fingers 31 pass as the mold bottoms are turning around the left-hand sprocket wheel 8. With this construction as each mold begins to turn around the left-hand sprocket wheel 8 the fingers 31 of the receiving platform pass through the notches 32 and engage the under side of the pallet 11 at one end thus lifting said pallet from the mold bottom and as the mold continues to turn around the sprocket wheel 8 the pallet with its molded block will be gradually delivered onto the receiving platform. This is done with an easy movement and without subjecting the block to any jar which is likely to disturb the concrete.

It is sometimes desirable to mold concrete blocks with an opening extending therethrough thus making a hollow block. Where this form of block is desired I may employ one or more cores in connection with each mold which serves to form the hollow chamber in the completed block. Where such a core is used I also propose to provide means for automatically withdrawing the core from the molded block so that said block will be free to be delivered onto the receiving platform. In the construction herein shown the machine is designed to make a block with a single chamber 33 therein as shown in Fig. 5.

Each mold has associated with it a core 34 and in order to provide for automatically removing the cores from the blocks I have shown one side 3 of each mold as having an opening through which the core can be projected and withdrawn and as provided with a sleeve 35 which forms a guide for the core in its movement. The core herein illustrated is cylindrical but may be of any shape depending on the shape which it is desired to give to the opening or chamber 33 in the block.

Figure 8:
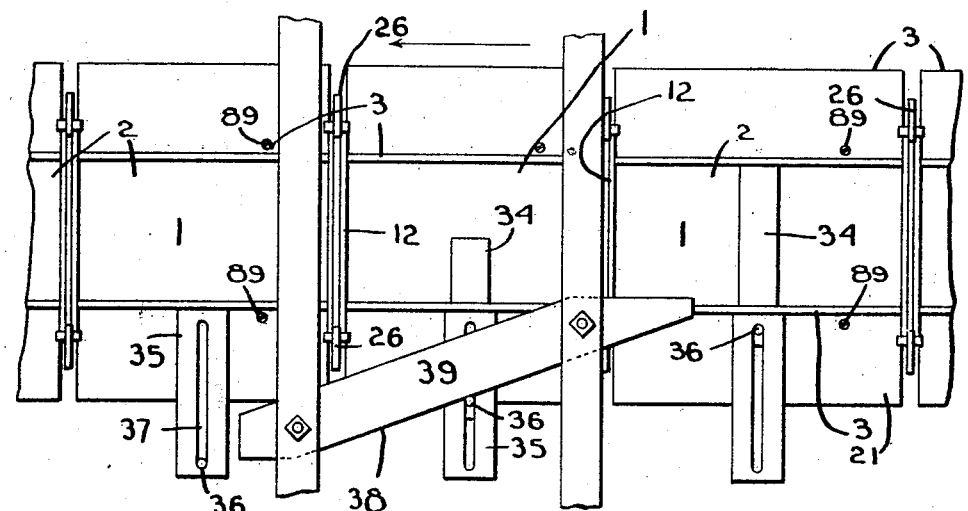
Figs. 8 and 9 are views illustrating the means for withdrawing the cores from the molds and reinserting them.
Figure 9:
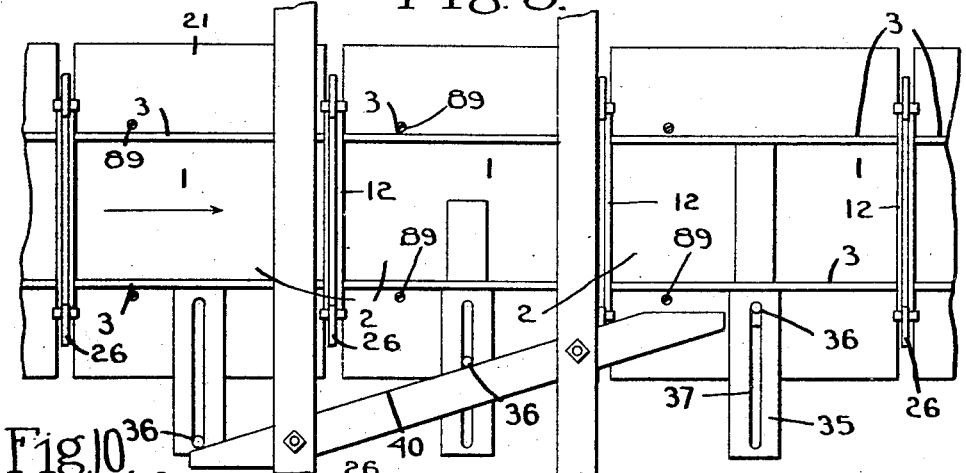
Figure 10:
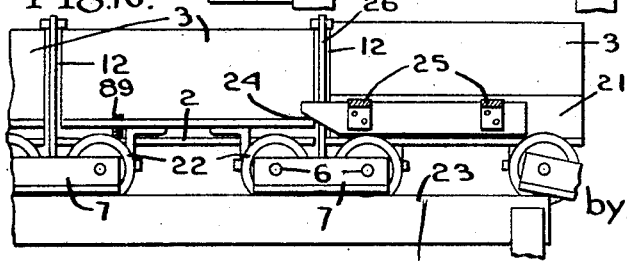
Fig. 10 is a fragmental view illustrating the means for swinging the mold sides away from the block when cores are not used.

Each core 34 is provided with a pin 36 which projects through and operates in a slot 37 formed in the corresponding guiding sleeve 35 and these pins 36 are adapted to engage the cam face 38 formed on a cam member 39 which is secured to the frame 10. This cam member is so placed that the pins 36 will engage the face thereof just before the sides 3 are opened and the engagement of the pins 36 with the cam face 38 will withdraw the cores from the molds as seen in Fig. 8. Just after the cores have been withdrawn then the flanges 21 of the sides engage the cam tracks 24 and are opened away from the block.

The cores are returned to their operative position by means of another cam 40 which is situated to be engaged by the pins 36 as the molds are travelling along the under run of the endless chain arrangement.

If it is desired to make a block without the chamber 33 then the cores 34 are retained in their withdrawn position during the making of the block. This may be accomplished by removing the cams 39 and 40, they being removably attached to the frame for this purpose.

The cores 34 are shown as having projections 52 extending outwardly from their ends and these projections are adapted to engage the cam track 51 above described for the purpose of swinging the sides 3 of the molds which carry the cores outwardly away from the molded blocks. With this construction, therefore, where cores are employed one of the sides 3 is separated from the block and swung into the dotted line position Fig. 2 by the cam face 24 engaging the wing 21 of the mold side and the other side 3 is swung into the dotted line position Fig. 2 by the engagement of the projection 52 on the core with the cam face 51. As stated above, however, if the cores are not used then a cam 24 may be used for opening both sides 3 away from the molded blocks.

While I have illustrated herein a selected embodiment of my invention I do not wish to be limited to the constructional features shown.

I claim.

1. In a machine for molding concrete blocks, the combination with a plurality of molds connected together to form an endless chain arrangement, each mold being open at one end and having at the other end a guide extending to the top of the mold, a partition movably carried by each guide, each partition when in operative position closing the end of the mold by which it is carried and also the open end of the adjacent mold, means for filling the molds, and means to move the partitions in their guides thereby to withdraw them from between the molds after the molded blocks are formed.

2. In a device of the class described, the combination with a plurality of molds connected together to form an endless chain arrangement, each mold being open at one end and having at the other end a guide extending to the top of the mold, a partition movably carried by each guide, each partition when in operative position forming the end of the mold by which it is carried and closing the open end of the adjacent mold, means for filling the molds, means for delivering the molded blocks from the molds at one end of said endless chain arrangement, and means for moving the partitions in their guides and thus withdrawing them from between the molded blocks before the latter are delivered.

3. In a device of the class described, the combination with a plurality of molds connected together to form an endless chain arrangement, the sides of each mold being swingable outwardly and each mold being open at one end and having at the other end a guide extending to the top of the mold, a partition movably carried by each guide, each partition when in operative position forming the end of the mold by which it is carried, and closing the open end of the adjacent mold, means to fill the molds as they travel along the upper run of the endless chain arrangement, means for withdrawing the partitions from between the molded blocks as they approach one end of said run, and means for swinging the sides of the mold outwardly to free them from the molded blocks.

4. In a device of the class described, the combination with a plurality of molds connected together to form an endless chain arrangement, each mold having an open end and also having at the other end a guide extending to the top of the mold, a partition movably carried by said guide, each partition when in operative position closing the open end of the mold by which it is carried and also the open end of the adjacent mold, a roll carried by each partition, an adjustable track with which the rolls engage and which maintain the partitions in a position determined by the adjusted position of the track, means to fill the molds and means to withdraw the partitions from between the molded blocks.

5. In a machine of the class described, the combination with a plurality of molds connected together to form an endless chain arrangement, each mold being open at its end and having at the other end a guide extending to the top of the mold, a partition movably carried by each guide, each partition when in operative position closing the end of the mold by which it is carried and also the open end of the adjacent mold, means for filling the molds, a projection extending from each partition, a cam track situated to engage each projection as the corresponding mold passes into the upper run of the endless chain arrangement, said cam track maintaining the partitions in their operative position while the molds are being filled, means whereby said cam tracks may be adjusted thereby to vary the height of the partitions, and means to withdraw the partitions from between the molded blocks after they are formed.

6. In a device of the class described, the combination with a plurality of molds connected together with an endless chain arrangement, partitions separating said molds, each partition being movable toward the center of the endless chain arrangement to withdraw it from the mold, and means for adjustably supporting the partitions while the molds are being filled, whereby blocks of different thicknesses may be made.

7. In a device of the class described, the combination with a plurality of molds connected together in an endless chain arrangement, partitions separating said molds, each partition being adjustable as to its height, means for filling the molds, and a vertically-adjustable levelling roll for determining the thickness of the blocks.

8. In a device of the class described, the combination with a plurality of molds connected together to form an endless chain arrangement, of partitions separating said molds, means for filling the molds, and a levelling roll for determining the thickness of the molded blocks, said partitions and said levelling roll being vertically adjustable, whereby the thickness of the block may be gauged.

9. In a device of the class described, the combination with a plurality of molds connected together to form an endless chain arrangement, the sides of the molds being pivotally mounted and swingable outwardly, means to fill the molds, the side of each mold having a core guide, a core movably mounted in said guide and swingable with the mold sides, means to move each core in its guide to withdraw it from the mold after the latter is filled, and means to swing the mold side and the core carried thereby laterally thereby to separate the side from the molded block.

10. In a machine for molding concrete blocks, the combination with a plurality of molds connected together to form an endless chain arrangement, means to fill the molds, the sides of the molds being swingable outwardly to separate them from the molded block, a tubular guide secured to the side of each mold, a core slidably mounted in each guide, means to move the cores in the guide and thus withdraw them from the molds after the latter are filled, and means to swing the sides of the mold with the cores outwardly thereby to separate the sides from the molded blocks.

In testimony whereof, I have signed my name to this specification.

SAMUEL S. LEVY.